(12) United States Patent
Minakata et al.

(10) Patent No.: US 6,219,469 B1
(45) Date of Patent: Apr. 17, 2001

(54) OPTICAL WAVEGUIDE DEVICES, TRAVELING-WAVE LIGHT MODULATORS, AND PROCESS FOR PRODUCING OPTICAL WAVEGUIDE DEVICES

(75) Inventors: Makoto Minakata, Hamamatsu; Minoru Imaeda; Takashi Yoshino, both of Nagoya; Kenji Kato, Ama-Gun, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 08/922,020

(22) Filed: Sep. 2, 1997

(30) Foreign Application Priority Data

Sep. 6, 1996 (JP) .................................................. 8-255301
Mar. 21, 1997 (JP) .................................................. 9-085579

(51) Int. Cl.⁷ .................................................. G02F 1/035
(52) U.S. Cl. .................................. 385/2; 385/8; 359/245
(58) Field of Search .............................. 385/2, 3, 8, 40, 385/1, 4; 359/245

(56) References Cited

U.S. PATENT DOCUMENTS

| 5,367,216 | * 11/1994 | Egara et al. ........................ 310/313 |
| 5,402,154 | 3/1995 | Shibaguchi et al. . |
| 5,790,719 | * 8/1998 | Mitomi et al. ........................ 385/2 |
| 5,801,871 | * 9/1998 | Madabhushi ........................ 359/245 |

FOREIGN PATENT DOCUMENTS

| 63-141021 | * 6/1988 | (JP) ........................................ 385/2 |
| 1-219819 | * 9/1989 | (JP) . |
| 4-204815 | * 7/1992 | (JP) ........................................ 385/2 |
| 5-241115 | * 9/1993 | (JP) . |
| 6-67130 | * 3/1994 | (JP) ........................................ 385/2 |

* cited by examiner

Primary Examiner—Hemang Sanghavi
(74) Attorney, Agent, or Firm—Burr & Brown

(57) ABSTRACT

An optical waveguide device includes a substrate having a pair of opposed main planes, an optical waveguide formed on one of the opposed main planes, and an electrode portion, wherein a thickness of a portion of the substrate at at least a location where the electrode portion is formed is made smaller than at a remainder thereof.

15 Claims, 6 Drawing Sheets

FIG_1a
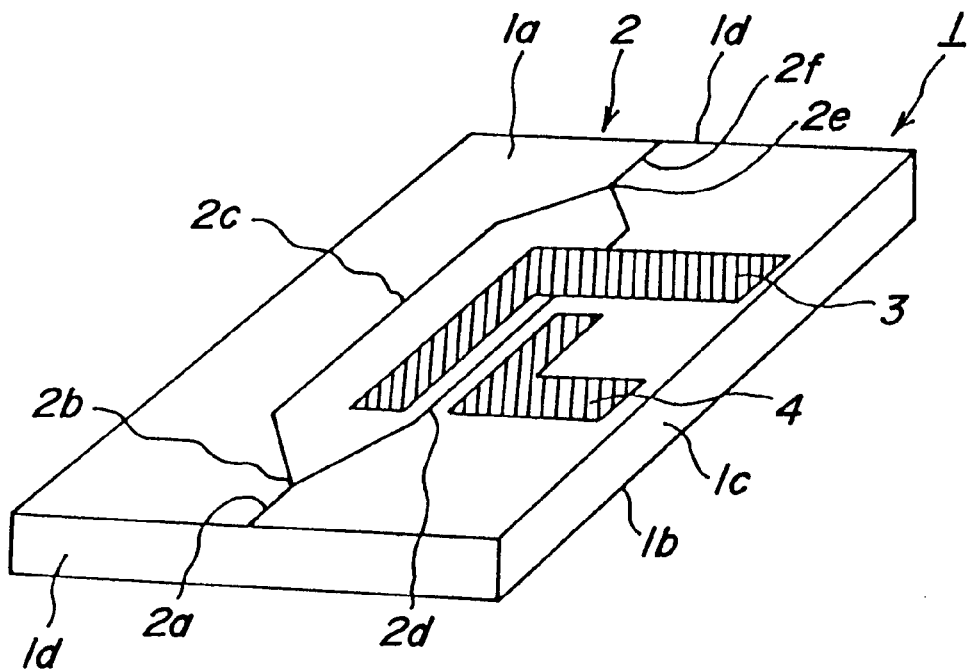
FIG_1b
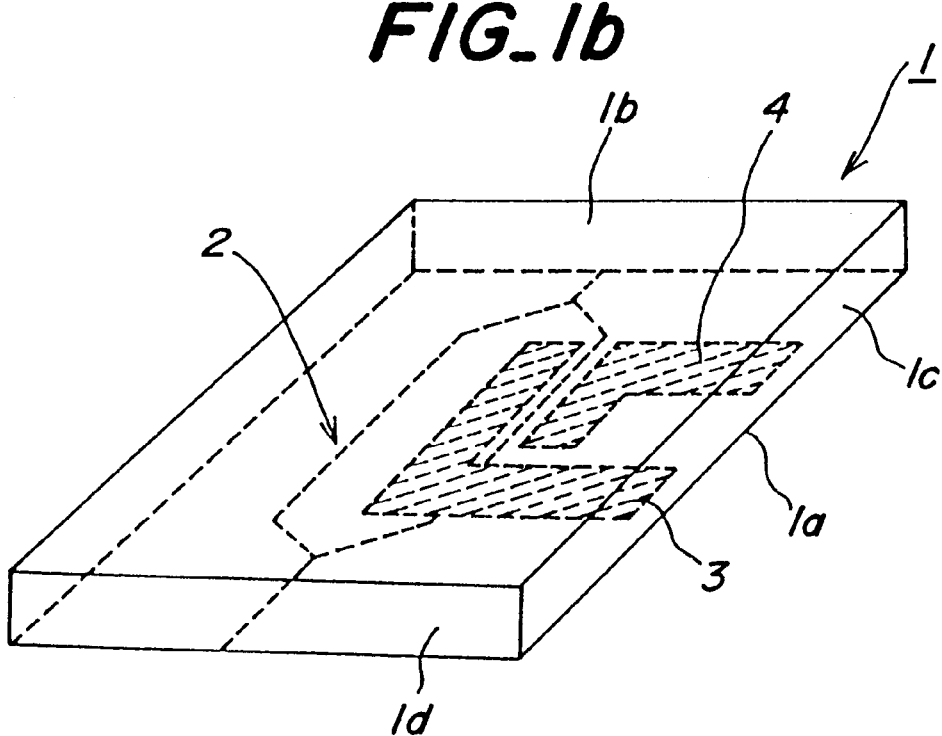

FIG_2a
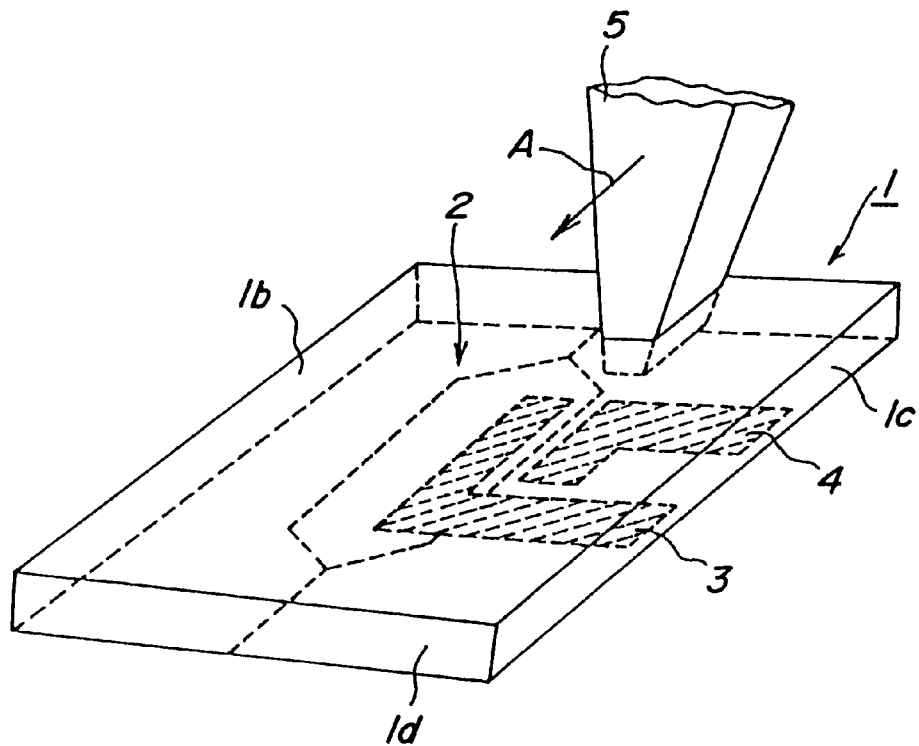
FIG_2b
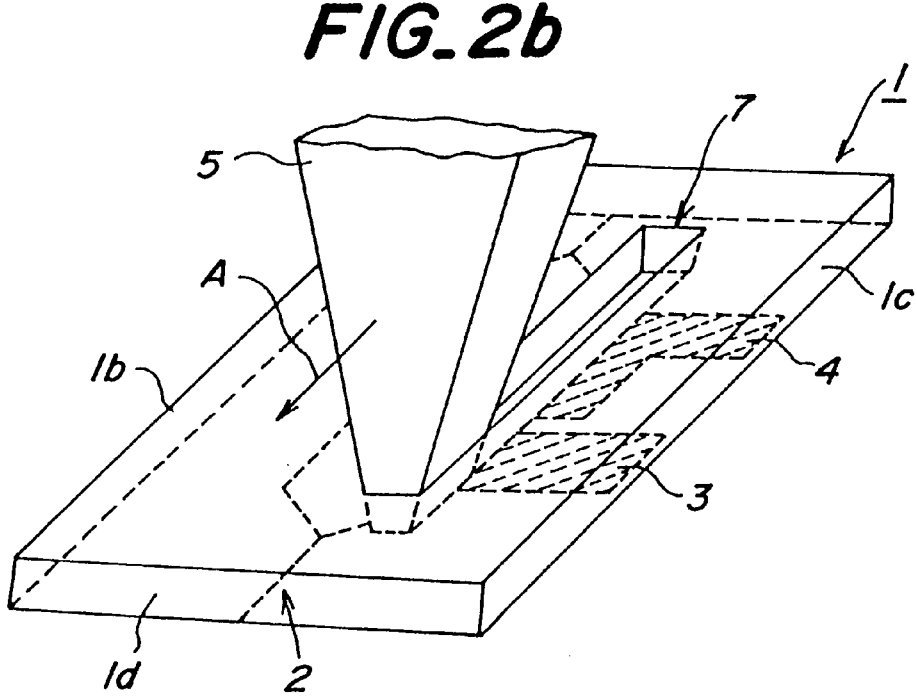

FIG_3a
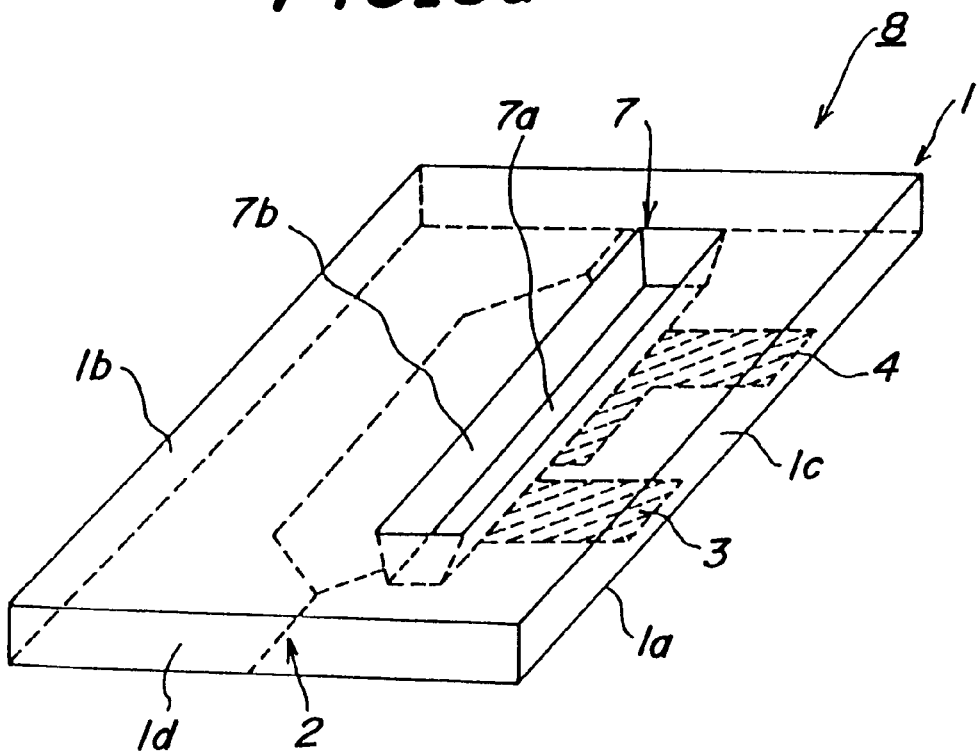
FIG_3b
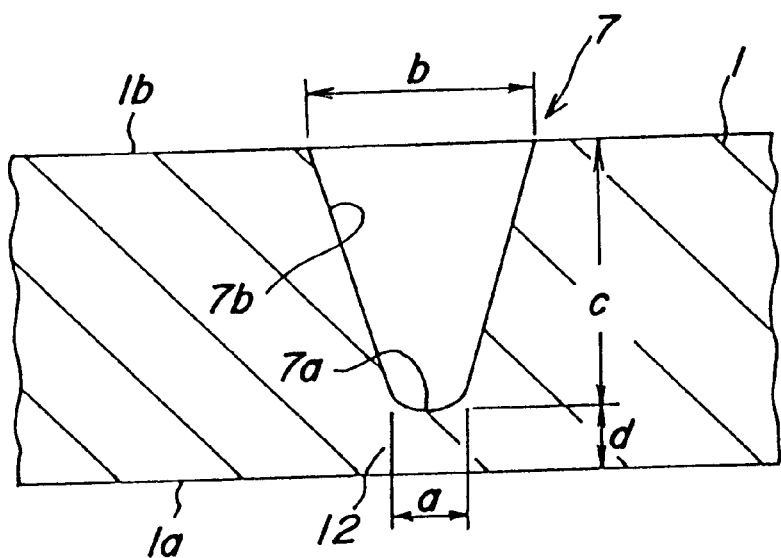

FIG_4a
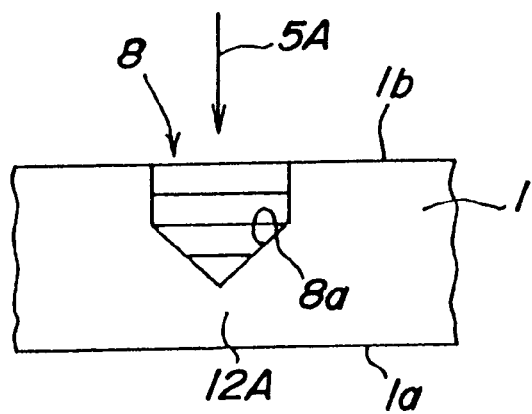
FIG_4b
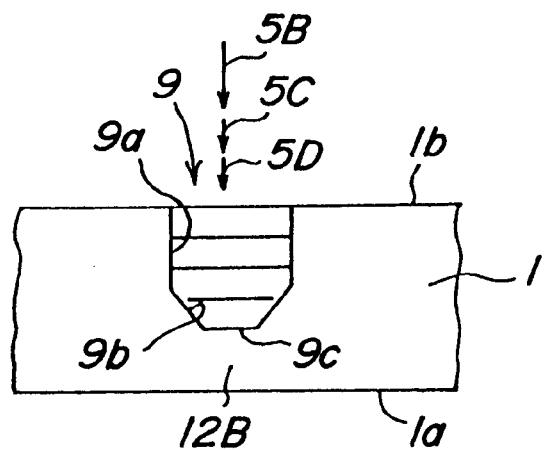
FIG_4c
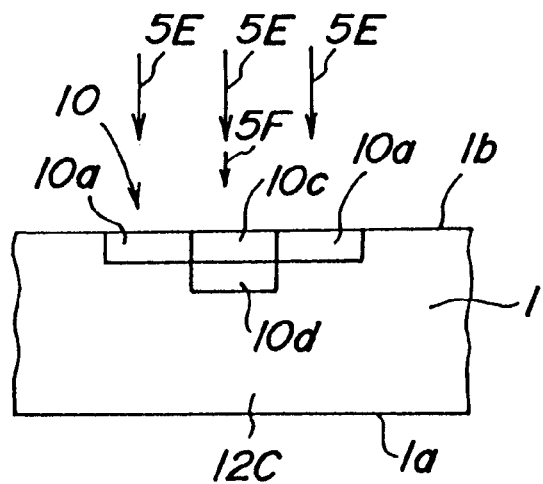

OPTICAL WAVEGUIDE DEVICES, TRAVELING-WAVE LIGHT MODULATORS, AND PROCESS FOR PRODUCING OPTICAL WAVEGUIDE DEVICES

BACKGROUND OF THE INVENTION (1) Field of the Invention

The present invention relates to optical waveguide devices, travelling-wave light modulators, and a process for producing the optical waveguide devices.

(2) Related Art Statement

In the optical communication field, it is presumed that since the communication capacity will drastically increase, the capacity of the light transmitting system needs to be enlarged. At present, the light transmitting speed of 1.6 GB/sec. has been practically employed. However, as compared with the frequency band (about 200 THz) in which transmission can be effected through optical fibers, this level is merely one hundred thousandth. It is important in drastically increasing the transmission capacity to develop the light modulation technology.

There is the possibility that a traveling-wave light modulator using lithium niobate ($LiNbO_3$), lithium tantalate ($LiTaO_3$) or gallium-arsenide (GaAs) for the optical waveguide, can realize a broad bandwidth at a high efficiency. Lithium niobate and lithium tantalate have materials as a excellent materials as a ferroelectric properties have large electro-optical coefficients and can control light within a short optical path. Factors which suppress the modulation frequency of the traveling-wave light modulator, are velocity mismatch, dispersion and electrode loss. Since the velocity mismatch and the dispersion are determined by the structure of the traveling-wave light modulator, it is important to analyze the structure and make appropriate design thereof. On the other hand, the conductivity and a surface skin effect of the material is important for the electrode loss.

The concept of velocity mismatch will now be further explained. In the traveling-wave light modulator, the velocity of the light propagating through the optical waveguide largely differs from that of the modulating wave (microwave) propagating along this electrode. Assume that the light and the modulation wave propagating through the crystal have different velocity Vo and Vm, respectively. For example, in the case of the $LiNbO_3$ optical modulator having planar type electrodes, the refractive index of the $LiNbO_3$ single crystal is 2.14, and the velocity of the light propagating through the optical waveguide is inversely proportional to the refractive index. On the other hand, the effective index for modulating wave is given by a square root of the dielectric constant near a conductor. $LiNbO_3$ is uniaxial crystal, and the dielectric constant in the Z-axis direction is 28 and that in the X-axis and Y-axis directions is 43. Therefore, even if an influence of air having the dielectric constant of 1, the effective index for modulating wave in the $LiNbO_3$ modulator having a conventional structure is about 4 which is about 1.9×2.14. Thus, the velocity of the light wave is large about 1.9 times as much as that of the modulating wave.

The upper fm bandwidth of the light modulator or the modulating velocity is inversely proportional to a difference in velocity between the light wave and the modulating wave. That is, fm=1/(Vo−Vm). Therefore, assuming that the power loss by electrode is zero, a limit is a fm bandwidth X electrode length 1=9.2 GHz.cm. Actually, it is reported that in a light modulator having an electrode length 1=2.5 mm, fm=40 GHz. The effect due to the limit of operation speed becomes more conspicuous as the electrodes become longer. Therefore, a light modulator having a broad bandwidth and high efficiency has been earnestly demanded.

Recently, it is proposed in the case of the optical waveguide devices such as the optical waveguide-type high speed modulators and the high speed switches that the phase matching frequency between the light propagated through the optical waveguide and the modulating wave applied from outside voltage is shifted to a higher side by tens of GHz through designing the configuration of an upper electrode on a substrate in a special shape or forming a layer of glass ("EO devices using LN" in "O plus E", May 1995, pp 91–97).

According to this literature, since the speed of the modulating wave is determined by the average value of the dielectric constant of an area through which electric forces pass between a thin signal electrode and an earth electrode, the modulating speed is increased by thickening the electrode and a buffer layer composed of $SiO_2$. Further, since the traveling-wave type electrode constitutes a traveling passage, its characteristic impedance needs to be around 50 Ω. In order to satisfy the above requirements, it is proposed that the electrode and the buffer layer be designed in a protruded shape, a hang-over shape, a grooved shape, sealed shape or the like.

However, since the buffer layer and the electrodes having complicated configurations need be formed on the substrate in the traveling-wave light modulator the production process is complicated since a lot of producing steps are needed, and the production cost is high. In addition, the optical waveguide must be kept in alignment with the buffer layer and the electrodes having the complicated configurations at high accuracy. Furthermore, characteristics such as refractive index are likely to be changed by the formation of a work damaged layer due to damage during the production process. According to a simulation result of an optical waveguide device, the characteristics are degraded and a light absorption characteristic and an extinction ratio characteristic become insufficient.

In addition, although the above difficult problems resulting from the production process are solved, it is still difficult to realize high speed modulation of greater than 10 GHz.cm.

SUMMARY OF THE INVENTION

It is an object of the present invention to provide an optical waveguide device comprising a substrate having a pair of opposed main planes, and an optical waveguide formed on one of the main planes, and an electrode portion, in which an operating speed of the optical waveguide device is increased.

Further, it is another object of the present invention to provide a process for producing such an optical waveguide device by a simple measure.

Further, it is another object of the present invention to provide a traveling-wave light modulator which enables high speed modulation, can be produced by a smaller number of steps, makes high accuracy alignment unnecessary, and is free from a work damaged layer due to the working process.

The optical waveguide device according to the present invention comprises a substrate having a pair of opposed main planes, and an optical waveguide formed on one of said opposed main planes, and an electrode portion, wherein a thickness of a portion of the substrate at least at a location where the electrode portion is formed is made smaller than at a remainder thereof.

The present inventors had continuously researched the above problems and have provided an optical waveguide device such as a traveling-wave light modulator which operates at a higher speed as compared with the conventional ones. During the research, the inventors reached a technical idea that a portion of the ferroelectric substrate at least at a location where the electrode portion is positioned is thinner than a remainder of the substrate. Various simulation and modulation tests by using such traveling-wave light modulators revealed that modulation could be effected at an extremely high speed of not less than 15 GHz.cm. The present invention has been accomplished based on the above knowledge.

In addition, the inventors discovered that the thinner portion of the substrate can be formed by providing a groove or a depressed portion at a side of a rear surface, and that the groove or the depressed portion can be formed at a high speed and high accuracy by mechanical working or ablation working. As a result, the inventors confirmed that the optical guidewave device and the traveling-wave light modulator according to the present invention can be produced at high productivity.

At that time, in order to further increase the modulation speed, the thickness of the thinner portion of the substrate is preferably not more than 50 μm, and more preferably not more than 20 μm. On the other hand, in order to maintain given strength for the electrode portion, the thickness of the thinner portion of the substrate is preferably not less than 5 μm.

The substrate needs to have given strength from the standpoint of handling. If the substrate is too thin, defective products (i.e., broken or cracked) are likely to be produced. According to the present invention, a thinner portion is formed only at a given location which will influence the operation speed of the electrode portion, while the remainder has a thickness large enough to afford sufficient strength upon the substrate. Therefore, the remainder of the substrate other than its thinned portion is preferably not less than 150 μm. The thickness of this remainder is preferably not more than 1000 μm.

The relation between the thickness of the thinned portion of the substrate and the maximum 3dB band width is shown in Table 1. As is seen from Table 1, when the thinned portion has a thickness of not less than 100 μm, the 3 dB band width is around 10 GHz.cm. When the thinned portion has a thickness of 50 μm, the 3 dB band width is around 15 GHz.cm. When the thinned portion has a thickness of 10 μm, the 3 dB band width is around 30 GHz.cm. When the thinned portion has a thickness of 5 μm, the 3 dB band width is around 10 GHz.cm. Thus, the modulation speed is largely increased by decreasing the thickness of the thinned portion of the substrate. When the thickness of the thinner portion was 3 μm, the substrate was cracked.

TABLE 1

| Thickness of thinned portion (μm) | 3 | 5 | 10 | 20 | 50 | 100 | 300 |
|---|---|---|---|---|---|---|---|
| 3 dB band width GHz · cm | — | 100 | 30 | 20 | 15 | 10 | 10 |

The above function and effect are considered to be attained as follows:

When the substrate is thinned at a location corresponding to the electrode portion by forming a groove or depressed portion at the rear face, the electric field formed by modulation wave (microwave) propagating the electrode portion leaks into air (the groove or the depressed portion) at the rear face side of the substrate to a large extent. As a result, the velocity of the modulation wave increases, and the phase matching can be made even at a zone where such phase matching is difficult in the conventional technique.

In the traveling-wave light modulator, each of the substrate and the optical waveguide is preferably made of at least one kind of single crystals selected from the group consisting of a single crystal of lithium niobate, a single crystal of lithium tantalate and a single crystal of lithium niobate-lithium tantalate solid solution. The orientation of the substrate may be either any one of X, Y and Z. The optical waveguide can be formed at the surface of the substrate by a conventional titanium diffusion technique, and the electrode can be also formed on the substrate by a conventional process.

Further, calculation of the correction factors of the electric field with respect to the orientations of the substrate revealed that the correction factor largely varied depending upon the orientations of the crystal. That is, as shown in Table 2, the use of the substrates of which the orientation is the X-cut or Y-cut gives a merit in that the half-wave voltage i.e., operating voltage, of the device can be reduced by decreasing the thickness of the substrate. To the contrary, if the substrate of which orientation is Z-cut is used, it is a demerit that the half-wave voltage increases with decrease in the thickness of the substrate. In general, there is a problem in the case of the Z-cut orientation that a buffer layer of such as silicon oxide needs to be formed on the substrate to cope with a DC drift. Therefore, use of the substrate of the X-cut or Y-cut orientation gives a large merit.

TABLE 2

| Thickness of thick portion (μm) | | | 3 | 5 | 10 | 20 | 50 | 100 | 300 |
|---|---|---|---|---|---|---|---|---|---|
| X cut | | Correction factor of electric field, Γ | 0.84 | 0.81 | 0.70 | 0.65 | 0.62 | 0.6 | 0.6 |
| Y cut | | Half-wave voltage Vπ(V) | 5.0 | 5.2 | 6.0 | 6.5 | 6.8 | 7.0 | 7.0 |
| Z cut | | Correction factor of electric field, Γ | 0.17 | 0.21 | 0.35 | 0.53 | 0.58 | 0.6 | 0.6 |
| | | Half-wave voltage Vπ(V) | 25 | 20 | 12 | 6 | 7.2 | 7.0 | 7.0 |

Length of electrodes = 10 mm, Gap between electrodes = 20 μm

As to the above-mentioned ablation working, various lasers may be used. Among them, an excimer laser is particularly preferable. The ablation working is a working process in which an intended profile is obtained by irradiating a high energy beam such as excimer laser beam upon a target object and instantly decomposing and evaporating a portion of the object upon which the high energy beam is irradiated. The excimer laser is a laser beam having a wavelength of 150–300 nm in an ultraviolet zone, and its wavelength may be selected by changing the kind of a gas to be charged.

The present inventors investigated the ablation working technique with the excimer laser, assist etching working technique in liquid with the laser, etc. in working the rear surface of the ferroelectric substrate. As a result, the inventors discovered that the thinner portion can be formed at the substrate at extremely high productivity by the ablation waveguide devices with the thinned portions, grooves and depressed portions had excellent stability in the optical characteristics and shape.

The optical characteristics are stable for the following reason. That is, since a portion of the substrate upon which light is irradiated is instantly decomposed and evaporated in the ablation working, an area in the vicinity of the light-irradiated portion where no light directly hits is not almost influenced by heat, stress, etc. Thus, it is considered that completely no work damaged layer is formed along the thinner portion of the substrate.

As a light source for ablation working, light having a shorter wavelength side of an absorption edge of the material constituting the substrate needs be used. However, light having a wavelength of not more than 350 nm is preferred. Particularly when light having a wavelength of not more than 350 nm is used in case that a substrate of an oxide single crystal is to be worked, the light irradiated upon the substrate is absorbed into an extremely surface portion, so that only a surface layer is decomposed, whereas the inside of the substrate is not damaged by working.

Since the wavelength area favorable for the above ablation working varies depending upon the location of the light absorption edge of the crystal to be worked, such a wavelength area cannot be definitely specified. However, the oxide single crystals to be used in the optical waveguide ordinarily have light absorption edges in a wavelength area of not more than 350 nm. Therefore, for example, if argon laser having a wavelength of 512 nm is used, excellent ablation working was impossible. The reason is that since the wavelength of this argon laser is larger than the absorption edge of the substrate material, the light penetrates into the interior of the crystal so that ablation based on the absorption of the light in the surface portion is unlikely to occur.

The wavelength of the light for ablation working is more preferably not more than 300 nm. From the standpoint of the practical application, the wavelength is preferably not less than 150 nm. As an actual light source, the fourth harmonic generation of YAG laser (266 nm laser beam), an excimer lamp, etc. may be practically used at present besides the excimer laser light source.

As a light irradiator for ablation working, a so-called simultaneous type irradiator and a multi-reflective type irradiator are known. In the multi-reflective type irradiator, the utilizing percentage of the light is high even if the open rate of a mask is small. In the present invention, a multi-reflective type ablation working apparatus is preferably used. By so doing, a chip pattern can be worked over an entire wafer having a dimension of not less than 1 inch in a short time.

The excimer laser will be further explained. The excimer laser is an oscillation laser in which pulses of ultraviolet rays are repeatedly generated. Ultraviolet rays generated by gaseous compounds such as ArF (wavelength: 193 nm), KrF (wavelength: 248 nm) or XeCl (wavelength: 308 nm) are extracted by an optical resonator while being arrayed to a given direction. Since the excimer laser is a short wavelength laser of ultraviolet rays, bonds between atoms and molecules constituting a substance can be decomposed with energy of photons, and its applications based on this chemical reaction have been developed.

It is reported that the ablation working with the excimer laser is used, for example, to bore holes for finely working polyimide, and fine holes having a good shape can be formed ("Excimer laser entering its practical application stage" in "O plus E", November 1995, pp 64–108).

In the present invention, the following three embodiments may be recited to form optical waveguides with a groove or depressed portion at the rear face of the electrodes with use of the excimer laser.

(1) Spot scan working: A light flux having a spot-shaped section is irradiated upon a rear surface (the other main plane) of a substrate such that an optical axis of the light flux is vertical to the rear surface of the substrate, and the light flux is advanced in a given direction. As a result, a groove is formed at a portion of the substrate where the light flux passes. According to this process, a worked heaped layer can be removed from the substrate by etching after working.. Further, since the pattern of the groove is formed by scanning the light flux having the spot-shaped section upon the substrate, a thinned portion having an arbitrary shape can be formed on it.

(2) Simultaneous transfer working: A light flux having been preliminarily passed through a mask with a given transfer pattern is directly irradiated upon a main plane of a substrate, and a groove having a planar pattern is formed without moving the light flux. According to this process, since the planar transfer pattern of the mask is transferred upon the substrate at one time, the working efficiency is high, and reproductivity of the planar shape of the groove is extremely high. However, since the laser beam needs to be generated over a wide area, the mask needs to be produced at higher accuracy, and accuracy of an optical system needs be enhanced.

(3) Slit scan working: Laser beam is passed through a mask with a slit having a slender pattern, thereby obtaining a laser beam flux having a slender, rectangular, planar section. This slit-like laser beam is irradiated upon a rear face of a substrate, and is moved. According to this process, the configuration of a bottom face of a groove formed by working is particularly smooth. However, only a groove having a planar straight shape can be formed in this process.

If the ablation working is effected by using the excimer laser, the surface of the rear face of the thinned portion (the bottom surface of the groove) of the substrate needs be made smooth. Actually, the groove could be worked by the excimer laser at accuracy of not more than 1 μm. Further, although the thickness of the thinned portion of the substrate needs be finely controlled, the working could be done up to accuracy of not more than 0.5 μm relative to a target thickness. In order to realize working at such a high accuracy, it is preferable that ablation working is effected, while the thickness of the thinned portion of the substrate is being measured by a laser interferometer.

In addition, the above mentioned thinner portion could be formed by high accuracy mechanical working. In this case, the thinner portion is most preferably worked by cutting. As a mechanically working machine, a slicing apparatus with a Z-direction accuracy being enhanced can be favorably used. Further, a rotary body with a cutting blade is preferably used.

These and other objects, features and advantages of the invention will be appreciated upon reading of the following description of the invention when taken in conjunction with the attached drawings, with the understanding that some modifications, variations and changes of the same could be easily made by the skilled person in the art.

BRIEF DESCRIPTION OF THE DRAWINGS

For a better understanding of the invention, reference is made to the attached drawings, wherein:

FIG. 1(a) is a perspective view for schematically illustrating a travelling-wave light modulator 1 of a Mach- Zehnder type as viewed from one main plane 1a, and FIG. 1(b) is a perspective view for illustrating the traveling-wave light modulator 1 as viewed from the other main plane 1b;

FIG. 2(a) is a perspective view for schematically illustrating the state that the modulator in FIG. 1(b) is being worked by irradiating laser upon it, and FIG. 2(b) is a perspective view for illustrating the state that this working is advanced;

FIG. (3a) is a perspective view for illustrating the worked modulator 8, and FIG. 3(b) is a sectional view of the substrate in a vicinity of a groove 7;

FIG. 4(a) is a schematic view for illustrating the configuration of a groove formed when a focus-fixed type spot scan working was employed, FIG. 4(b) is a schematic view for illustrating the configuration of a groove 9 formed when exposure was effected at plural times while its focus was stepwise adjusted, and FIG. 4(c) is a schematic view for illustrating the configuration of a groove 10 formed when exposure was effected at plural times while the planar location of the focus was varied;

DETAILED DESCRIPTION OF THE INVENTION

Figure 5:
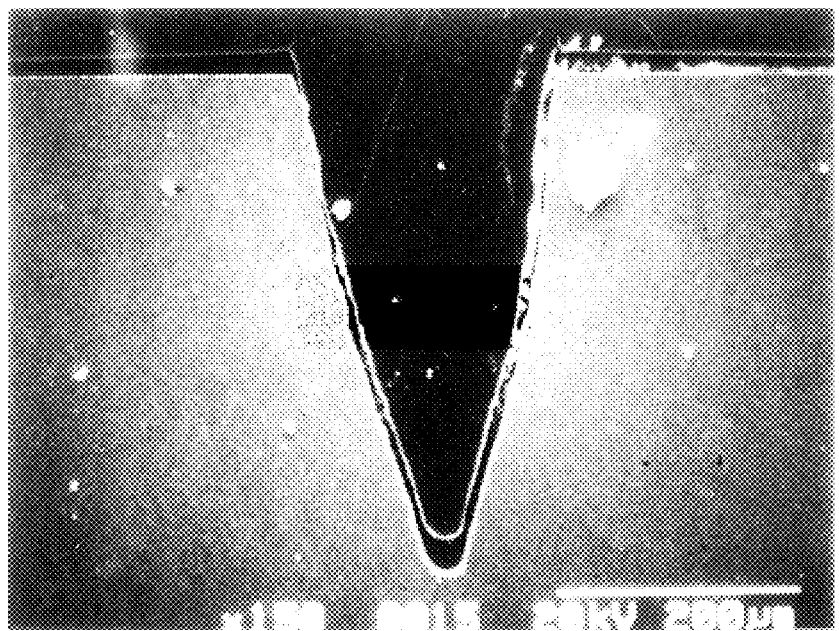
FIG. 5 is an optical microscope photograph showing a cross-sectional shape of the groove 8 formed by the system in FIG. 4(a)

The present invention will be explain in more detail with reference to the attached drawings. FIG. 1(a) is a perspective view for illustrating a traveling-wave light modulator 1 of a Mach-Zehnder type as viewed from a front main plane 1a before the modulator is worked, and FIG. 1(b) is a perspective view for illustrating the modulator 1 as viewed from a rear main plane 1b. An optical waveguide 2 of the Mach-Zehnder type is formed on a side of the main plane 1a of the modulator. The optical waveguide 2 is formed at the main plane 1a, extending between a pair of side faces 1d and almost in parallel to side faces 1c. The optical waveguide 2 includes stem portions 2a, 2f, branched points 2b, 2e and a pair of branched portions 2c, 2d. A pair of opposed electrodes 3, 4 are formed on the substrate, sandwiching one of the branched portions 2d, and each electrode is connected to a power source not shown.

Next, as shown in FIG. 2(a), the laser 5 is irradiated upon a given location of the other main plane 1b, and scanned on the substrate by moving it in an A-arrow direction. As a result, as shown in FIG. 2(b), a groove 7 is formed. As shown in FIG. 3(a), the slender groove 7 is finally formed on a side of the other main plane 1b of the substrate 1 within an area corresponding to the electrodes 3, 4. As shown in FIG. 3(b), for example, the groove 7 has a bottom face 7a and inclined faces 7b. A thinned portion 12 is formed in a zone where the groove 7 exists.

In FIGS. 2(a) and 2(b) is shown ablation working based on the spot scan system. The same groove 7 as above may be formed by the simultaneous exposure system or the slit scan system.

Next, embodiments in which the laser exposure system is variously varied will be explained with reference to FIGS. 4(a), 4(b) and 4(c). FIG. 4(a) is a schematic view for illustrating the configuration of a groove formed when a focus-fixed type spot scan working was effected. In FIG. 4(a), a groove 8 is formed by exposing a rear main plane 1b of a substrate to irradiation of laser 5A at one time, thereby forming a thinned portion 12A. At that time, since the laser is appropriately focused upon a portion of the groove 8 near the other main plane 1b, side planes almost vertical to the main plane 1b are formed. However, as the location approaches a bottom face of the groove 8, focus deviation becomes greater, so that the side faces 8a of the grooves become inclined to the main plane 1b. This process is practical only if a lens having a long focus length is used, and this process requires high output laser.

FIG. 4(b) shows the configuration of a groove 9 formed when exposure was effected at plural times, while the focus was stepwise adjusted. For example, as shown by 5B, 5C and 5D, exposure was effected, while the focus was adjusted three times. According to this process, the depth of faces 9a almost vertical to the main plane 1b can be increased. A thinned portion 12B is formed at the substrate by the groove 9. However, since portions of the side faces 9b near a bottom face 9c are indeed inclined relative to a plane almost vertical to the main plane 1b, the thickness of the thinner portion 12B is likely to be non-uniform.

FIG. 4(c) shows the configuration of a groove 9 formed when exposure was effected at plural times, while the focus was stepwise adjusted. For example, as shown by 5B, 5C and 5D, exposure was effected, while the focus was adjusted three times. According to this process, the depth of faces 9a almost vertical to the main plane 1b can be increased. A thinned portion 12B is formed at the substrate by the groove 9. However, since portions of the side faces 9b near a bottom face 9c are indeed inclined relative to a plane almost vertical to the main plane 1b, the thickness of the thinner portion 12B is likely to be non-uniform.

FIG. 4(c) shows the configuration of a groove 10 formed when exposure was effected at plural times, while a planar location of the focus was moved. First, exposure was effected over a wide area as shown by 5E, thereby forming a peripheral portion 10a and a central portion 10c of the groove 10. In this state, the peripheral portion 10a has almost the same depth as that of the central portion 10c, and the depth of each of the peripheral and central portions 10a and 10c is smaller than the groove 8 shown in FIG. 4(a), side faces of the peripheral portion 10a are almost vertical to the main plane 1b. Then, the central portion 10c was exposed as shown by 5F, thereby forming a central portion 10d. A thinned portion 12C is formed at the substrate by the central portion 10d of the groove 10. According to this process, since the bottom face of the central portion 10d of the groove 10 can be made flat, the thickness of the thinned portion can be easily controlled constant. However, in this process, the number of exposure steps increases, and the thickness of the portion 10a of the substrate decreases so that strength of the substrate is likely to lower.

Figure 6:
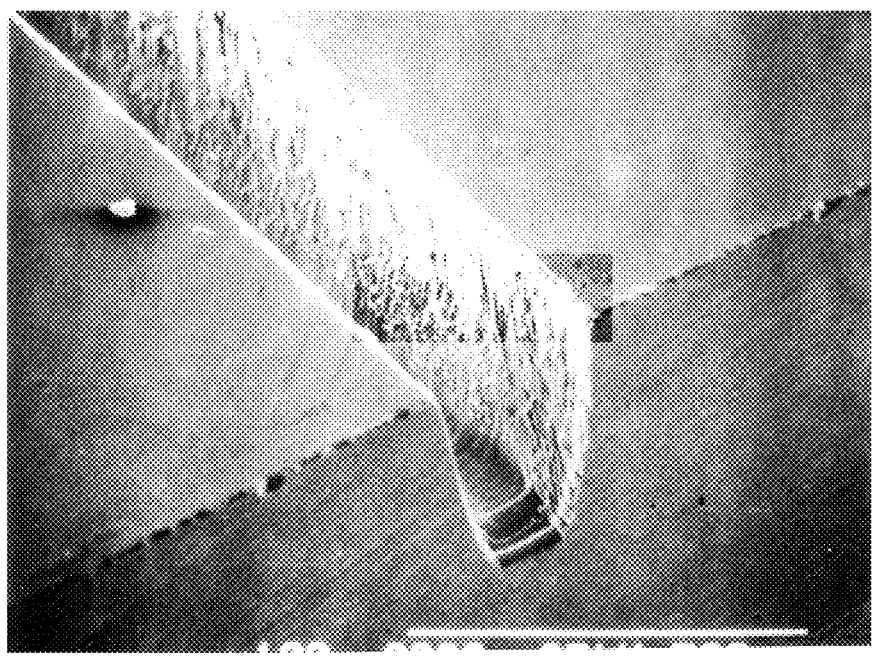
FIG. 6 is an optical microscope photograph for showing the groove 9 formed by the system in FIG. 4(b) as viewed from an oblique direction.
Figure 7:
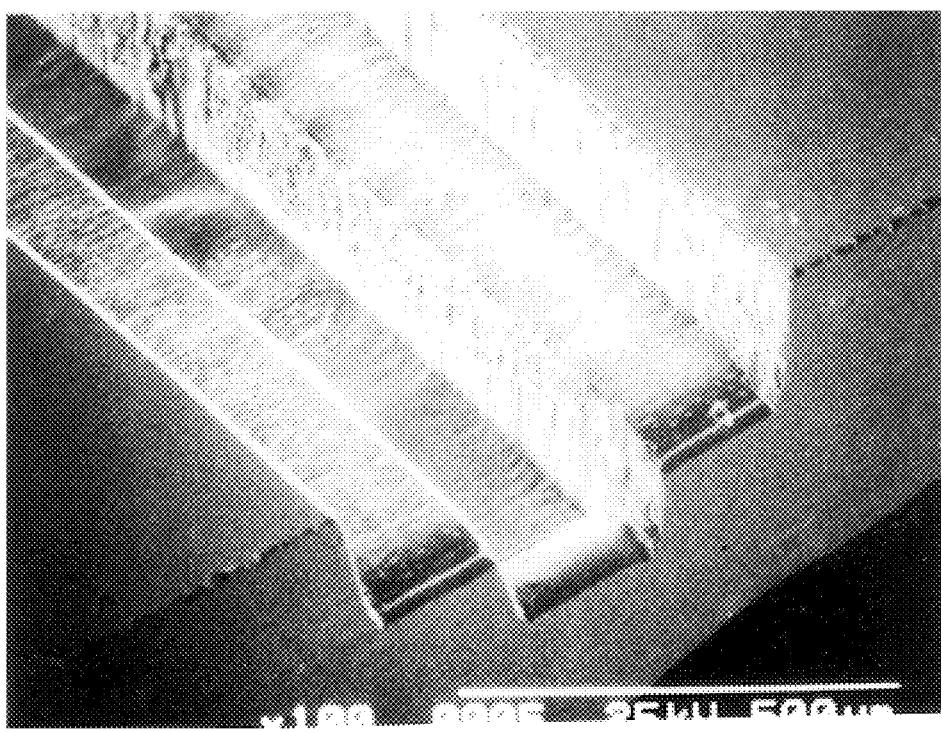
FIG. 7 is an optical microscope photograph for showing the groove 9 formed by the system in FIG. 4(c) as viewed from an oblique direction.

FIG. 5 is an optical microphotograph showing the configuration of a cross section of the groove formed according to the system in FIG. 4(a). FIG. 6 is an optical microphotograph showing the configuration of a cross section of the groove 9 formed according to the system in FIG. 4(b) as viewed in an oblique direction. FIG. 7 is an optical microphotograph showing the configuration of a cross section of the groove 10 formed according to the system in FIG. 4(c) as viewed in an oblique direction.

In the following examples, more concrete experimental results will be explained.

EXAMPLE 1

A substrate made of an X-cut, 3-inch wafer (LiNbO$_3$ single crystal) was ground to a wafer thickness of 300 μm at a rear face (the other main face). Then, an optical waveguide 2 and electrodes 3, 4 were formed in the shapes shown in FIG. 1 at a front face of the wafer by a titanium diffusion process and a photolithography process, thereby producing a traveling-wave light modulator of the Mach-Zehnder type. In Example 1, the wafer-shaped substrate was worked.

A resist film was coated on the main plane of the substrate. After the substrate was set at an excimer laser working machine, and a working position was adjusted with reference to an orientation flat face of the substrate. A KrF excimer laser was used as a light source, and exposure was effected by the spot scan system to work the other main plane. An optical system was so adjusted that the size of the irradiated spot might be 1.0 mm in a scanning direction and 0.2 mm in width at an irradiating energy density of 6 J/cm$^2$. A groove 7 was formed by working the rear face of the substrate upon which voltage was applied, under the condition that the width and the frequency of the pulse, and the scanning speed were 15 nsec., 600 Hz and 0.1 mm/sec., respectively.

The time period required for forming the groove in a length of 20 mm was 200 seconds. In FIG. 3(b), the cross sectional shape of the groove 7 thus formed was trapezoidal, in which an inlet width "b" of the groove 7 was 100 μm, a depth "c" was 290 μm, a width of a bottom face as 50–60 μm and a thickness "d" of a thinned portion 12 was 10 μm. The thus produced wafer was cut into traveling-wave light modulators by a dicing saw machine, and end faces of each travelling-wave light modulator were optically polished.

The insertion loss was about 6 dB for the light modulator without groove 7 and about 6 dB for the optical modulator formed with groove 7 with respect to a wavelength of 1.55 μm. Measurement of the 3 dB bandwidth revealed that the 3 dB band was 5 GHz for the optical modulator without groove 7 and 15 GHz for the light modulator with the groove 7 formed.

Further, measurement of the half-wave voltage revealed that the half-wave voltage was 3.5 for the light modulator without groove 7 and 3.0 V for the light modulator with the groove 7 formed.

EXAMPLE 2

As in the same manner as in Example 1, a traveling-wave light modulator of the Mach-Zehnder type was produced. A resist film was coated on a main plane of a wafer-shaped substrate, and the substrate was set at a micro grinder working apparatus. The working location was adjusted with reference to an orientation flat face. As a grinding stone, a resin-bonded diamond grinding stone having roughness No. #5000 was used. A groove 7 was formed by working a rear face side of the substrate where voltage was applied, under the condition that the number of revolutions was 30000 rpm, and the feed speed was 0.1 mm/sec.

The time period required for forming the groove in a length of 20 mm was about 5 minutes. In FIG. 3(b), the cross sectional shape of the groove 7 thus formed was rectangular, in which an inlet width "b" of the groove 7 was 80–100 μm, a depth "c" was 295 μm, a width "a" of a bottom face was 80–100 μm, and the thickness of the thinned portion was 5 μm. The thus produced wafer was cut into traveling-wave light modulators by a dicing saw machine, and end faces of each traveling-wave light modulator were optically polished.

The insertion loss was about 6 dB for the light modulator without groove 7 and about 6 dB for the optical of 1.55 μm. Measurement of the 3 dB band width revealed that the 3 dB band was 5 GHz for the light modulator without groove 7 and 50 GHz for the optical modulator with the groove 7 formed.

Further, measurement of the half-wave voltage revealed that the half-wave voltage was 3.5 V for the light modulator without groove 7 and 2.6 V for the light modulator with the groove 7 formed.

As mentioned above, according to the present invention, the operation speed can be increased in the optical waveguide comprising the substrate with a pair of the opposed main planes, the optical waveguide formed on one of the main planes, and the electrode portion. Further, the traveling-wave light modulator enables a high speed modulation, and can be produced by a smaller number of the steps, whereas high accuracy alignment is unnecessary, and the formation of the work damaged layer due to damages during working can be prevented.

What is claimed is:

1. An optical waveguide device comprising an X-cut or Y-cut substrate having a pair of opposed main planes, and an optical waveguide and electrodes formed on only one of said opposed main planes, wherein a groove is formed in the other of said opposed main planes of the substrate, wherein a thickness of a portion of the substrate is reduced at least at a location where the electrodes are formed.

2. The optical waveguide device set forth in claim 1, wherein each of said substrate and said optical waveguide is made of at least one single crystal selected from the group consisting of a single crystal of lithium niobate, a single crystal of lithium tantalate and a single crystal of lithium niobate-lithium tantalate solid solution.

3. The optical waveguide device set forth in claim 2, wherein the thickness of said portion of the substrate having the smaller thickness is not less than 5 μm and not more than 50 μm.

4. A process for producing the optical waveguide device claimed in claim 2, wherein said portion of the substrate having the smaller thickness is formed by working the substrate from the other main plane thereof.

5. A traveling-wave light modulator comprising the optical waveguide device set forth in claim 2 and a power supply unit for supplying electric power to said electrodes, wherein said substrate is made of an electro-optical single crystal having ferroelectricity, and said electrodes are constituted by a pair of electrodes between which voltage is applied to modulate a light propagating through the optical waveguide.

6. The optical waveguide device set forth in claim 1, wherein the thickness of said portion of the substrate having the smaller thickness is not less than 5 μm and not more than 50 μm.

7. The optical waveguide device set forth in claim 6, wherein the thickness of said remainder of the substrate other than said portion of the substrate having the smaller thickness is not less than 150 μm and not more than 1000 μm.

8. A process for producing the optical waveguide device claimed in claim 7, wherein said portion of the substrate having the smaller thickness is formed by working the substrate from the other main plane thereof.

9. A traveling-wave light modulator comprising the optical waveguide device set forth in claim 7 and a power supply unit for supplying electric power to said electrodes, wherein said substrate is made of an electro-optical single crystal having ferroelectricity, and said electrodes are constituted by a pair of electrodes between which voltage is applied to modulate a light propagating through the optical waveguide.

10. A process for producing the optical waveguide device claimed in claim 6, wherein said portion of the substrate having the smaller thickness is formed by working the substrate from the other main plane thereof.

11. A traveling-wave light modulator comprising the optical waveguide device set forth in claim 6 and a power supply unit for supplying electric power to said electrodes, wherein said substrate is made of an electro-optical single crystal having ferroelectricity, and said electrodes are constituted by a pair of electrodes between which voltage is applied to modulate a light propagating through the optical waveguide.

12. A process for producing the optical waveguide device claimed in claim 1, wherein said portion of the substrate having the smaller thickness is formed by working the substrate from the other main plane thereof.

13. The process for producing the optical waveguide set forth in claim 12, wherein said portion of the substrate having the smaller thickness is formed by ablation working.

14. The producing process set forth in claim 12, wherein said portion of the substrate having the smaller thickness is formed by mechanical working.

15. A traveling-wave light modulator comprising the optical waveguide device set forth in claim 1, and a power supply unit for supplying electric power to said electrodes, wherein said substrate is made of an electro-optical single crystal having ferroelectricity, and said electrodes is constituted by a pair of electrodes between which voltage is applied to modulate a light propagating through the optical waveguide.

* * * * *